(12) United States Patent
Hunter

(10) Patent No.: US 11,112,362 B2
(45) Date of Patent: Sep. 7, 2021

(54) PORTABLE IN-VITRO DIAGNOSTIC DETECTOR AND APPARATUS

(71) Applicant: Lumos Diagnostics IP Pty Ltd, Box Hill (AU)

(72) Inventor: William Samuel Hunter, Box Hill (AU)

(73) Assignee: LUMOS DIAGNOSTICS IP PTY LTD, Box Hill (AU)

( * ) Notice: Subject to any disclaimer, the term of this patent is extended or adjusted under 35 U.S.C. 154(b) by 869 days.

(21) Appl. No.: 15/526,324

(22) PCT Filed: Nov. 13, 2015

(86) PCT No.: PCT/AU2015/050708
§ 371 (c)(1),
(2) Date: May 11, 2017

(87) PCT Pub. No.: WO2016/074041
PCT Pub. Date: May 19, 2016

(65) Prior Publication Data
US 2017/0343474 A1    Nov. 30, 2017

(30) Foreign Application Priority Data

Nov. 14, 2014  (AU) .................................. 2014904581

(51) Int. Cl.
*G01N 21/64* (2006.01)
*G01N 21/84* (2006.01)
*G01N 21/00* (2006.01)

(52) U.S. Cl.
CPC ....... *G01N 21/645* (2013.01); *G01N 21/8483* (2013.01); *G01N 21/00* (2013.01);
(Continued)

(58) Field of Classification Search
CPC ......... G01N 21/645; G01N 2201/0221; G01N 21/00; G01N 2201/062; G01N 21/8483
See application file for complete search history.

(56) References Cited

U.S. PATENT DOCUMENTS 3,973,129 A  *  8/1976  Blumberg ............ G01N 21/276
                                                    250/461.2
6,600,598 B1 *  7/2003  Piekos ................... G02B 21/06
                                                    359/370
(Continued)

FOREIGN PATENT DOCUMENTS

EP         1550872        7/2005
WO     WO 1997/08523      3/1997
(Continued)

OTHER PUBLICATIONS

International Search Report and Written Opinion in international patent application No. PCT/AU2015/050708, dated Dec. 7, 2015.

(Continued)

*Primary Examiner* — Shogo Sasaki
(74) *Attorney, Agent, or Firm* — Knobbe Martens Olson & Bear LLP

(57) ABSTRACT

A portable in-vitro (PIV) diagnostic detector operable to perform a fluorescence assay on a sample in one or more detection chambers of a cartridge is provided. The PIV diagnostic detector comprises a first optical module which includes (i) an LED light source for emitting substantially monochromatic light to illuminate a detection zone associated with at least one detection chamber; (ii) an excitation filter interposed between said light source and said detection zone; (iii) a light detector operable to detect fluorescent light emitted by an excited fluorescent label associated with the sample and to measure an intensity of the fluoresced light; and (iv) an emission filter interposed between said light detector and said detection zone. The (PIV) diagnostic (Continued)

detector further comprises a microprocessor operable to process the measured intensity of the fluoresced light to determine whether an analyte is present in the sample; wherein the first optical module is configured such that a longitudinal axis of the light source extends at an oblique angle with respect to a longitudinal axis of the light detector.

14 Claims, 11 Drawing Sheets

(52) U.S. Cl.
CPC ............... *G01N 2201/0221* (2013.01); *G01N 2201/062* (2013.01)

(56) References Cited

U.S. PATENT DOCUMENTS

| | | | |
|---|---|---|---|
| 8,969,790 B1* | 3/2015 | Akselrod | G01T 1/02 250/252.1 |
| 2005/0109951 A1* | 5/2005 | Fish | G01N 21/8483 250/461.1 |
| 2008/0013092 A1 | 1/2008 | Maltezos et al. | |
| 2009/0211345 A1* | 8/2009 | Nahm | G01N 21/6428 73/61.55 |
| 2010/0061894 A1 | 3/2010 | Yamauchi | |
| 2010/0315644 A1 | 12/2010 | Egan | |
| 2014/0030737 A1* | 1/2014 | Holmes | G01N 1/30 435/7.24 |
| 2014/0045186 A1 | 2/2014 | Grubatayao | |
| 2014/0128596 A1 | 5/2014 | Zuk | |
| 2018/0246038 A1* | 8/2018 | Hunter | G01N 21/274 |
| 2018/0270474 A1* | 9/2018 | Liu | A61B 6/508 |
| 2018/0356344 A1* | 12/2018 | Yi | G01B 9/02075 |
| 2019/0064493 A1* | 2/2019 | Truong | G02B 21/0088 |
| 2019/0302437 A1* | 10/2019 | Hillman | G02B 21/0076 |

FOREIGN PATENT DOCUMENTS

| | | |
|---|---|---|
| WO | WO2009/099269 | 8/2009 |
| WO | WO2014/201520 | 12/2014 |

OTHER PUBLICATIONS

Search Report of GB application No. GB1506992.5, dated Jun. 23, 2015.

* cited by examiner

SPECTRUM DATA (NIR)  OPTIMA  ZWB2  DATE: Sep.02. 1999

| Wavelength(nm) | 220 | 240 | 260 | 280 | 300 | 320 | 340 | 360 | 380 | 400 | 420 | 440 | 460 | 480 | 500 |
|---|---|---|---|---|---|---|---|---|---|---|---|---|---|---|---|
| Transmssivity(%) | 0.880 | 1.065 | 1.143 | 1.178 | 8.179 | 42.597 | 65.279 | 69.713 | 44.311 | 1.886 | 1.140 | 1.150 | 1.157 | 1.152 | 1.132 |
| Wavelength(nm) | 520 | 540 | 560 | 580 | 600 | 620 | 640 | 660 | 680 | 700 | 720 | 740 | 760 | 780 | 800 |
| Transmssivity(%) | 1.165 | 1.159 | 1.161 | 1.150 | 1.160 | 1.151 | 1.151 | 1.162 | 1.167 | 2.239 | 12.106 | 22.155 | 15.061 | 8.880 | 6.318 |
| Wavelength(nm) | 820 | 840 | 860 | 880 | 900 | 920 | 940 | 960 | 980 | 1000 | 1020 | 1040 | 1060 | 1080 | 1100 |
| Transmssivity(%) | 4.014 | 2.907 | 2.427 | 2.170 | 3.043 | 2.792 | 2.604 | 2.088 | 1.878 | 1.826 | 1.705 | 1.634 | 1.515 | 1.452 | 1.401 |
| Wavelength(nm) | 1130 | 1160 | 1190 | 1220 | 1250 | 1280 | 1310 | 1340 | 1370 | 1400 | 1430 | 1460 | 1490 | 1520 | 1550 |
| Transmssivity(%) | 1.266 | 1.204 | 1.234 | 1.250 | 1.234 | 1.247 | 1.273 | 1.229 | 1.227 | 1.289 | 1.238 | 1.232 | 1.246 | 1.227 | 1.236 |
| Wavelength(nm) | 1580 | 1610 | 1640 | 1670 | 1700 | 1730 | 1760 | 1790 | 1820 | 1850 | 1880 | 1910 | 1940 | 1970 | 2000 |
| Transmssivity(%) | 1.219 | 1.272 | 1.254 | 1.209 | 1.196 | 1.174 | 1.175 | 0.980 | 0.816 | 0.905 | 0.814 | 1.6247 | 1.9724 | 1.4199 | 1.244 |

PORTABLE IN-VITRO DIAGNOSTIC DETECTOR AND APPARATUS

CROSS-REFERENCE TO RELATED APPLICATIONS

The present application is a U.S. National Phase Application of PCT International Application No. PCT/2015/050708 filed on Nov. 13, 2015, and entitled "A PORTABLE IN-VITRO DIAGNOSTIC DETECTOR AND APPARATUS," which claims priority from Australian Provisional Patent Application No. 2014904581 filed on Nov. 14, 2014, and entitled "A PORTABLE IN-VITRO DIAGNOSTIC DETECTOR" the contents of which are incorporated herein by reference.

TECHNICAL FIELD

This disclosure relates to a portable in-vitro (PIV) diagnostic detector operable to perform a fluorescence assay on a sample in one or more detection chambers of a cartridge, in order to detect the presence or absence of at least one analyte in a sample. Such a PIV diagnostic detector would typically be used in an instrument or a reader in a point-of-care (POC) setting, such as a clinician's office. The disclosure further relates to an apparatus operable to perform a fluorescence assay on a sample.

BACKGROUND

Present methods for the diagnosis of many medical conditions are tending towards small portable point of care (POC) diagnostic systems. This is because at present, most diagnostic tests are conducted off-site in clinical pathology laboratories. Such laboratories often use complex and expensive instrumentation requiring expensive reagents and highly trained technicians. Instrumentation may include, for example, high throughput clinical chemistry analysers based on ELISA (Enzyme Linked Immunoasobent Assay), molecular diagnostic assays and other techniques.

A significant problem with the use of centralized clinical pathology testing is the delay in obtaining the results of such tests, and in the case of infectious diseases, such delays can be potentially hazardous to the patient's wellbeing as well as posing unacceptable risks of infection to others in the community.

There are also certain tests, for example influenza, gastroenteritis, sepsis, myocardial infarction and several sexually transmitted diseases where the clinician ideally requires immediate or very rapid test results to be obtained in order to implement immediate patient treatment. In remote locations, there may not be a clinical pathology infrastructure near to the point of testing, and once again, delays in obtaining test results in such circumstances could be life-threatening.

Rapid tests are available for many medical conditions which may be procured at low cost. These tests are typically referred to as lateral flow tests, also known as lateral flow assays, membrane based assays. Almost all such tests are based on the use of nitrocellulose membrane material on a backing strip within a cartridge to wick a sample analyte to spatially separated test and control locations.

Whilst such tests offer rapid results, a problem with lateral flow tests is that a significant concentration of the antigen or antibody must be present in the sample analyte in order for the development of a visible line. Consequently, these types of tests have a poor degree of sensitivity resulting in a substantial number of false negative results, especially when a patient is in the early stages of an infection, and when the concentration of a particular antigen, antibody or viral load in a patient may be low. Moreover, it is in the early stages of detection that it is important that diagnosis is correctly performed in order to administer an appropriate therapeutic to the patient, or to quarantine the patient to prevent the further spread of the infectious disease to the remainder of the community.

To address this problem some manufacturers have developed lateral flow tests that employ fluorescent labels to facilitate more sensitive and earlier detection of the presence of an analyte. These fluorescent membrane based tests are utilised along with readers designed specifically for such membranes. Although these fluorescent membrane assays and readers can yield some increase in sensitivity (typically less than one log), the cost of the detection equipment required has limited the market for such tests. The high-cost and complexity of such readers detracts from the main benefit of lateral flow testing, which is that it is based on a very cheap, robust, and easy to use test which is compact enough to be carried anywhere.

Furthermore, in remote locations, there may not be a clinical pathology infrastructure near to the point of testing, and once again delays in obtaining accurate test results in such circumstances could be life-threatening. In these circumstances, a lab-bench based instrument is not appropriate.

Prior art readers for lateral flow tests have also had some problems in the analysis of multiplexed tests. For example, one type of prior art reader used in such cases is a camera-based reader imaging at least one membrane in an assay cartridge which is statically held in a fixed position. The use of camera-based imaging devices to image multiple membranes and multiple test and control lines on membranes requires that such cameras are positioned at a considerable distance from the source of fluorescent emission in order to cover the field of view. In such cases, the field of view for the camera detector must also be kept clear of obstructions, and therefore the excitation light source must also be positioned at a considerable distance from the test and control lines on the membranes. The inverse-square rule teaches that light intensity is inversely proportional to the square of distance. Thus, in the case of the excitation light source positioned remotely from the membrane, the intensity of the fluorescence excitation light exciting the fluorophore at the test and control line locations is reduced in proportion to the square of the distance of the light source from the target. Thus, a single LED, for example, which produces an excitation light intensity of X Lux at a distance of 5.0 mm from the target will only produce an intensity of 0.04X Lux if it is positioned 25.0 mm from the target. This reduction in the intensity of the excitation light at the target thereby proportionally reduces the intensity of the emitted fluorescent light by a factor of 0.04X, thereby detracting from the sensitivity of the system. Hardware compensation schemes may be used to improve performance, for example collimated light sources such as laser diodes, use of multiple high powered LEDs, use of optical fibre light guides, use of lenses and light collectors, and the use of more sensitive cameras such as peltier-cooled high sensitivity cameras. However, each of these approaches either individually or in combination lead to relatively complex, costly, and bulky readers. Where software compensation schemes are further introduced to compensate for lower light levels from the emitting fluorophore (for example increasing camera exposure times to capture more photons of fluorescent emission), such measures cause additional problems—in particular introducing unwanted photobleaching of fluorophores which again detracts from assay performance.

Another type of prior art reader used in such cases which does not suffer from the inverse-square light-loss problem utilises a scanning approach. With this type of approach, the excitation source and detector are positioned close to the membrane, and the membrane is moved uni-directionally past a read head which measures the fluorescent excitation as a fluorescently-emitting test or control line passes by that read head. The problem with this approach is that relatively complex and expensive motor-driven scanning mechanisms are required. This problem is exacerbated when multiple membranes are arrayed side by side, in which case either the scanning mechanism is further complicated either by requiring a more complex bi-directional motor-driven motion stage, or by uni-directional scanning in combination with more complex and expensive line scan illuminators and detection elements. Line scanning systems also require one of the most expensive elements of such a system (the optical thin-film interference excitation and emission filters) to become larger and considerably more expensive as such filters need to be large to cover the optical illumination and detection windows.

Either type of prior art fluorescent readers (static camera type, or scanning motion types) in combination with membrane-based lateral flow assays are invariably relatively expensive to produce and because of this cost they are typically designed to be re-usable over a period of several years. Because reader performance may decline over the years (for example long term decline of LED intensity), complicated and time-consuming calibration measures need to be introduced and performed by users to periodically monitor and adjust long-term reader performance. Furthermore, there are maintenance issues associated with such readers which may require periodic cleaning of optical elements. Still further, there are field support costs associated with repair, software upgrades, and user support for such readers. Consequently, the long term operating cost of such readers may be considerably higher than the purchase cost, and such readers may only suit sites where income from a relatively high volume of tests can offset the purchase and operating costs of such readers.

FIG. 1 shows a prior art arrangement widely used in fluorescent detection for diagnostic applications. This arrangement is known as a confocal fluorescent detection approach, since the fluorescent excitation light to the sample, and the fluorescent emitted light from the sample are co-linear. Because of this co-linearity, it is necessary to utilise a dichroic mirror element which reflects light above a wavelength threshold (defined by the emission wavelength of the fluorophore) at $90°$ back to a detector. The confocal arrangement ensures that unwanted fluorescent excitation light is blocked from being received at the detector, which therefore only receives fluorescent emitted light from the sample.

In prior art fluorescence detection systems, typical prior art excitation filters are thin film interference filters (TFIFs). Three TFIFs are required in a confocal arrangement for each detection zone, these being an excitation filter, an emission filter, and a dichroic mirror. Interference filters can be produced with very sharp transmission slopes, which result in steep cut-on and cut-off transition wavelength bands. Steep cut-on and cut-offs are desirable for fluorescent labels used in many diagnostic applications as many such labels have a narrow Stokes shift. Hence, sharp filter cutoffs are desirable for narrow Stokes shift fluorophores in order to block unwanted excitation light at the photodetector. TFIFs utilise the Fabry-Perot effect, and are constructed of alternating layers of vacuum-deposited optical coatings with different refractive indices built upon a glass substrate. The blocking efficiency of TFIFs may also be very high, with light blocking transmission up to 7 orders of magnitude, which again assists in blocking unwanted excitation light at the photodetector. Whilst confocal fluorescent detection devices offer exceptional performance, its use as a reader for application in a lateral flow is prohibitive due to the cost of the TFIFs.

A second type of diagnostic test increasingly being used at POC location is the molecular diagnostic test. Such tests are typically "sample to answer" type integrated systems. Such systems typically comprise a microfluidic cartridge in which all steps of a molecular diagnostic assay are conducted, for example sample introduction, nucleic acid extraction, elution of nucleic acids, polymerase chain reaction (PCR), and probe detection. The microfluidic cartridge is typically a closed consumable to avoid undesired nucleic acid carryover and associated contamination from one sample to the next. The assay processing steps within the cartridge are typically delivered via an associated instrument which also reports the results of the assay.

The results of the PCR detection are frequently obtained by utilising fluorescent detection of the molecular probes within a PCR chamber in the cartridge as the amplification reaction proceeds. Accordingly, the instrument requires a fluorescent detector, which is ideally a low cost, high performance detector. Where such molecular diagnostic cartridges have multiple PCR chambers, or where a number of cartridges are processed contemporaneously by an instrument, the instrument must have either (a) a camera based fluorescent detection system; (b) a single fluorescent detector which is moved by a scanning system, or; (c) a fixed array of low cost detectors of the type described in an embodiment of this invention. For reasons disclosed previously, options (a) and (b) each have several problems associated with them.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or step.

SUMMARY

A portable in-vitro (PIV) diagnostic detector is provided, the detector operable to perform a fluorescence assay on a sample in one or more detection chambers of a cartridge, the PIV diagnostic detector comprising:
  a first optical module comprising:
    an LED light source for emitting substantially monochromatic light to illuminate a detection zone associated with at least one detection chamber;
    an excitation filter interposed between said light source and said detection zone;
    a light detector operable to detect fluorescent light emitted from said detection zone by an excited fluorescent label associated with the sample and to measure an intensity of the fluoresced light; and an emission filter interposed between said light detector and said detection zone; and a microprocessor operable to process the measured intensity of the fluoresced light to determine whether an analyte is present in the sample;

wherein the first optical module is configured such that a longitudinal axis of the light source extends at an oblique angle with respect to a longitudinal axis of the light detector.

The PIV diagnostic detector may comprise a single optical module, two optical modules, three, four, five, six, seven or even eight optical modules.

In some embodiments the PIV diagnostic detector comprises two or more optical modules, and the respective light sources of each optical module are configured in a staggered arrangement. The respective light detectors of each optical module may further be configured in a staggered arrangement.

In some embodiments, the PIV diagnostic detector comprises two or more optical modules, and the PIV diagnostic detector is configured such that the optical modules are arranged in a row, parallel to the longitudinal direction of the cartridge. In other embodiments, the PIV diagnostic detector comprises two or more optical modules, and the PIV diagnostic detector is configured such that the optical modules are arranged in a row orthogonal to the longitudinal direction of the cartridge. In one embodiment, the optical modules are arranged such that a center of the first optical module is staggered relative to a center of the second optical module. In other words, the optical modules are arranged such that the centers of adjacent optical modules are staggered. In other embodiments the PIV diagnostic detector is configured such that there is no staggering between adjacent optical modules.

The PIV diagnostic detector may be configured such that each light source is positioned in vicinity of a first side of its respective light detector. Optionally, the light source of the first optical module may be arranged such that it is in the vicinity of a first side of its respective light detector and the light source of the adjacent optical module may be arranged such that it is in the vicinity of a second (opposite) side of its respective light detector.

In some embodiments the light emitting diode is an ultraviolet light emitting diode.

In some embodiments the light detector of each optical module is a photodetector. In some embodiments, the light detector is a light-to-frequency converter (LFC). LFCs are advantageous as the output is a square wave with frequency that is directly proportional to the light intensity input.

Advantageously, in embodiments where there are two or more optical modules, the staggering of at least at pair of optical modules, whether adjacent or not, leads to a more compact reader, thus improving portability, reduction in cost and operational bench space.

In some embodiments the assay may be a lateral flow assay. In some other embodiments the assay may be a molecular diagnostic assay.

In some embodiments, each optical module further comprises a converging lens interposed between the light source and the excitation filter. Such an embodiment advantageously increases the intensity of the emitted light illuminating the detection zone.

In one embodiment the excitation filter and the emission filter of each optical filter may comprise a dyed-glass absorbance filter.

In some embodiments, in respect of each optical module, a first converging lens may be positioned between the light source and the excitation filter, said first converging lens configured to focus light on said detection zone. In some embodiments, in respect of each optical module, a second converging lens may be positioned between the light detector and the emission filter, said second converging lens configured to focus light on said photodetector.

One of the advantages of the PIV diagnostic detector is that it is removable mountable to a cartridge, thus enabling re-use of the diagnostic detector for subsequent assays.

Further provided is an apparatus which is operable to perform a fluorescence assay on a sample in one or more detection chambers of a cartridge. The apparatus comprises a PIV diagnostic detector as described in any one of the embodiments described in paragraphs [0019] to [0030], and a cartridge, where the PIV diagnostic detector is removably mountable to the cartridge. In such an embodiment, the cartridge may comprise a plurality of slits with each slit configured to overlie one of said detector chambers. In some embodiments, the cartridge may be manufactured from a black or preferably matte-black plastic, or may be covered with an anti-reflective coating. Advantageously, such an embodiment reduces unwanted reflections of light or autofluorescence emissions from the cartridge. The cartridge may further comprise light baffle means positioned between each adjacent test strips. The light baffle means assists to ensure that the fluoresced light from each detection zone is detected independently.

BRIEF DESCRIPTION OF DRAWINGS

Non-limiting example(s) will now be described with reference to the accompanying drawings, in which.

DESCRIPTION OF EMBODIMENTS

We now refer to FIGS. 2 to 12, in which like numerals represent like elements throughout the several views.

Figure 4:
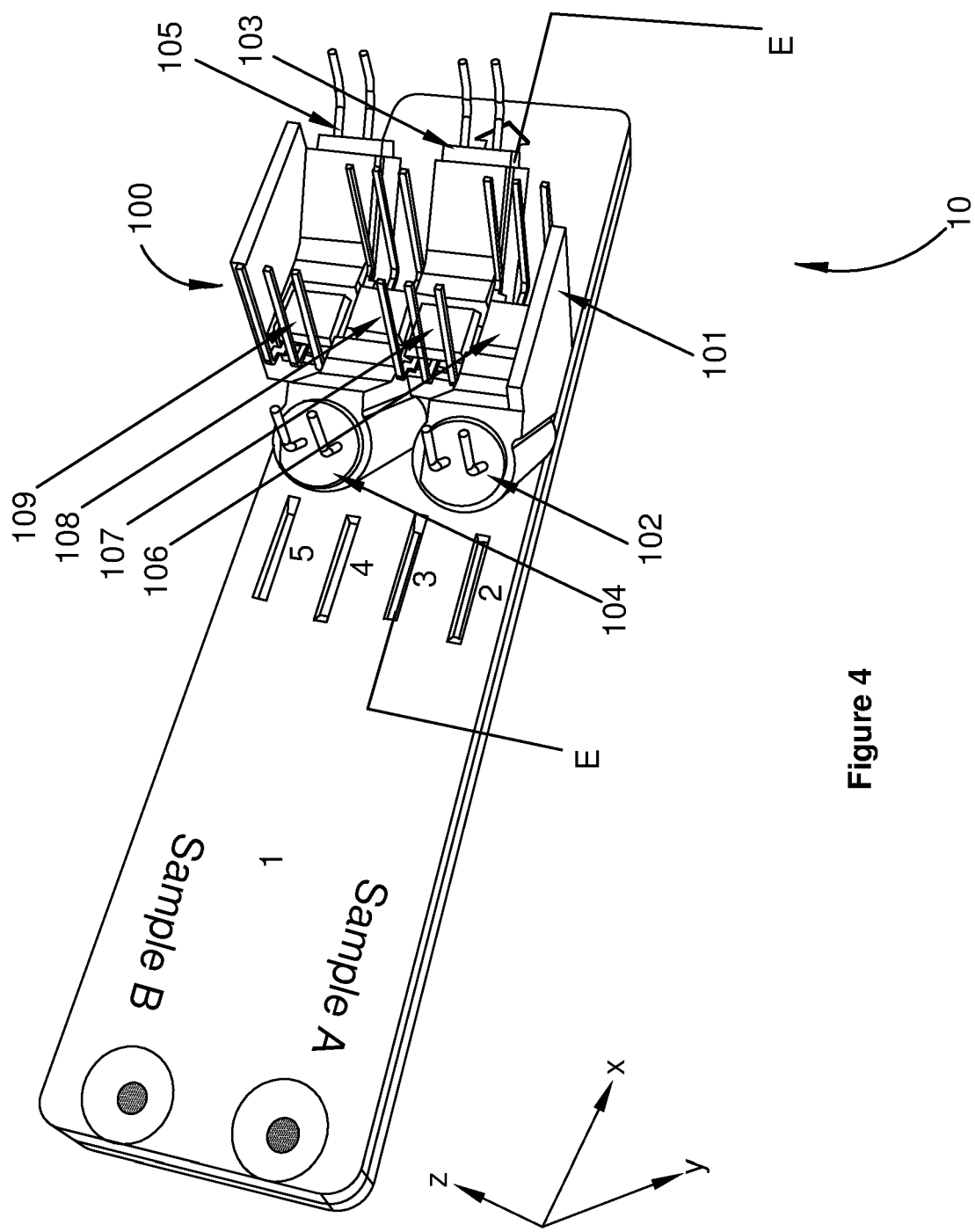
FIG. 4 is a view of an apparatus in accordance with one aspect of the invention which includes a PIV diagnostic detector in accordance with another aspect of the invention, where the light source and detectors of each optical modules of the PIV diagnostic detector are in a first configuration.

Referring firstly to FIG. 4, which shows an apparatus 10 in accordance with one aspect of the invention. The apparatus 10 is operable to perform a fluorescence assay on a sample in one or more detection chambers of a cartridge. The apparatus 10 includes a portable in-vitro (PIV) diagnostic detector 100 and a cartridge 1, wherein the PIV diagnostic detector 100 is removably mountable to the cartridge 1. In this aspect of the invention, the PIV detector is mounted to a printed circuit board (PCB) not shown, and that PCB includes various electronic components for signal processing and results display. The PCB is in turn mounted within an enclosure (not shown). The cartridge may be manually slidably inserted or removed into a slot within the enclosure to align correctly with the PIV, or the cartridge may be moved into position in the enclosure using a sliding drawer mechanism. The latter mechanism may be powered or manually actuated.

Considering first the cartridge 1, based on known prior art lateral flow tests it may be understood that slots 2-5 are respectively aligned over the test zones of four test strips aligned in parallel, and that there are another similar layout of slots (not shown, but beneath detector 100) aligned over the control zones of the same four tests strips. Thus, FIG. 4 is showing a quad-plex lateral flow test in combination with an exemplary PIV diagnostic detector 100 (the PIV diagnostic detector 100 being the subject of a further aspect of the invention), and the PIV diagnostic detector 100 is operable to detect the signals from each test strip at either the test or the control zone locations in the case of lateral flow tests.

The PIV diagnostic detector 100 comprises four optical modules held in a housing 101. It should be appreciate that portions of the housing 101 have not been shown to enable the interior of the housing to be visible. Each optical module includes an LED 102, 103, 104 or 105 and an associated photodetector 106, 107, 108 or 109. Whilst the slots 2-5, and respective test strips of cartridge 1 are aligned in parallel in the x-direction, it can be seen that slots 2 and 4 are staggered (which may also be described as shifted) with respect to slots 3 and 5 by an amount that is referred to as an offset. Accordingly, photodetectors 106 and 108 are staggered with respect to photodetectors 107 and 109 by the same offset. LEDs 102, 103, 104 and 105 are also configured in a staggered arrangement, however because LEDs 102 and 104 are positioned adjacent a first side of their respective photodetector and LEDs 103 and 105 are positioned adjacent a second side of their respective photodetector, the staggered arrangement of the LEDs is different to that of the photodetectors.

Figure 1:
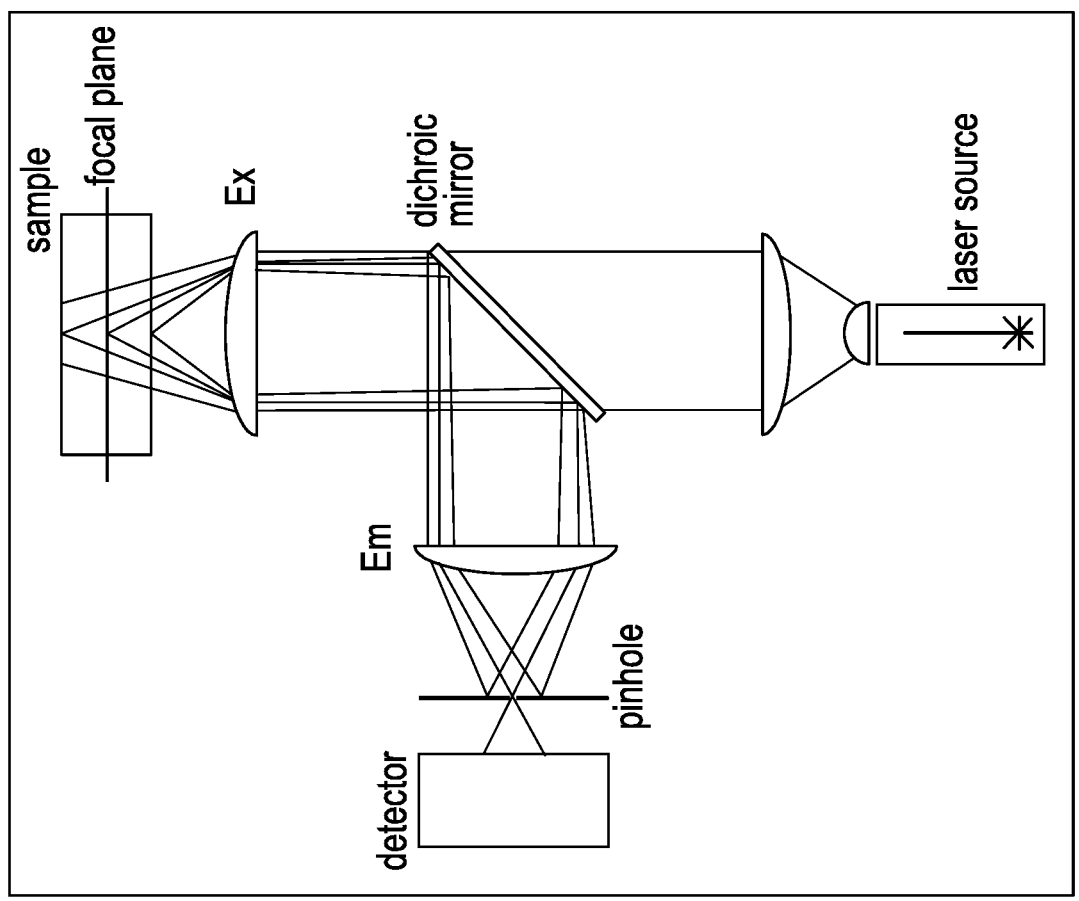
FIG. 1 is a schematic of a prior art confocal fluorescent detection arrangement commonly used in fluorescent spectroscopy.
Figures 2, 3:
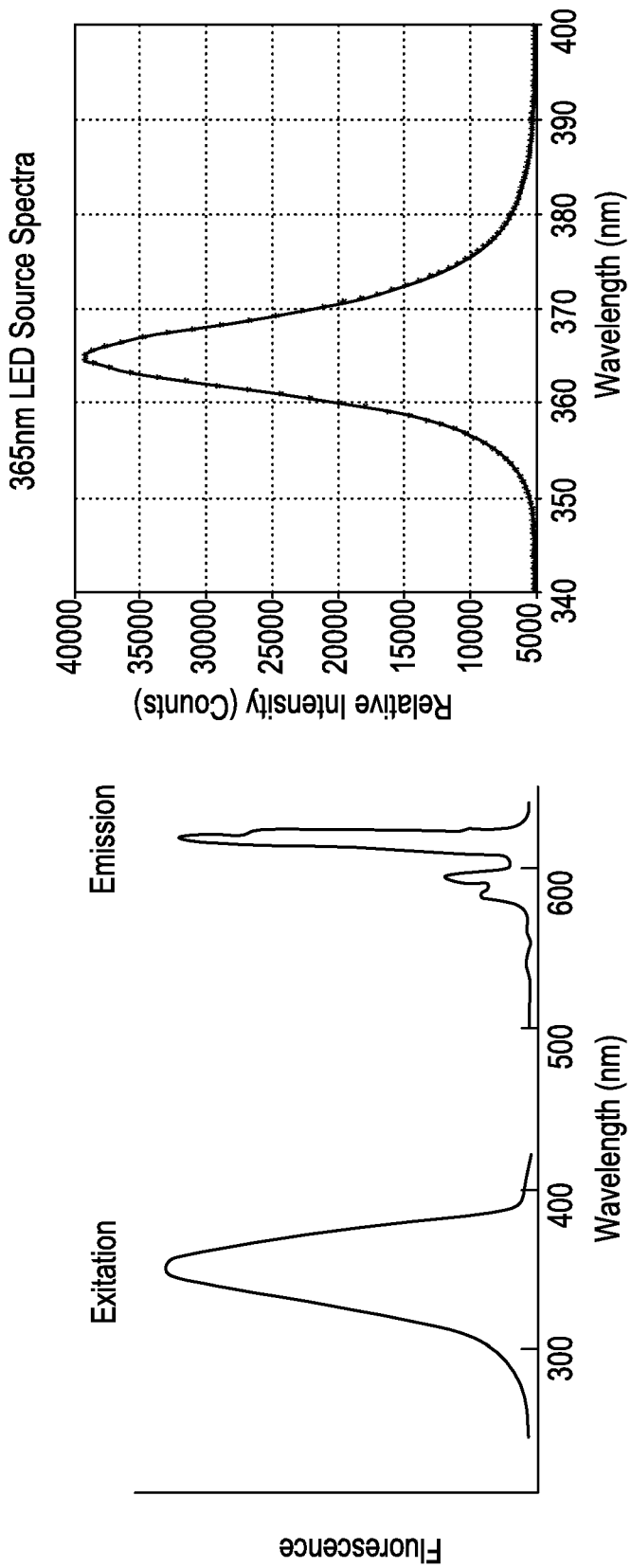
FIG. 2 is a plot of the excitation and emission spectra for Europium, a typical fluorescent label described in the invention as having a large Stokes shift.
FIG. 3 is a plot of the spectral emission for a 365 nm Ultraviolet (UV) light emitting diode (LED), which is an excitation source for Europium.

The analyte in the sample interacts with a fluorescent label. For example, the fluorescent label is a fluorescent monodisperse latex particle which is conjugated to one of the specific biological components of the assay, either antigen or antibody. This embodiment is described where the analyte in the sample interacts with a Europium labelled conjugate. FIG. 2 shows the excitation and emission spectra for the Europium label, and it can be seen that there is a large Stokes shift between the peak excitation wavelength at 365 nm (UV), and the peak emission wavelength at 615 nm (orange). Accordingly, in this embodiment the excitation LEDs 102-105 are preferably UV LEDs emitting a wavelength of about 365 nm. These LEDs emit a spectral light distribution as shown in FIG. 3 which overlaps the Europium excitation spectrum. The LEDs 102, 103, 104 and 105 may be of any type, for example 5 mm round, 3 mm round, surface-mount, or other varieties, and the housing 101 may be modified to suit different geometries accordingly. Each of the LEDs 102, 103, 104 and 105 is specific to one test strip and target, that is LED 102 is specific to the test strip beneath slot 2, LED 103 is specific to the test strip beneath slot 3, LED 104 is specific to the test strip beneath slot 4 and LED 105 is specific to the test strip beneath slot 5.

The PIV diagnostic detector 100 further comprises photodetectors 106, 107, 108, 109. Preferably the photodetectors are light-to-frequency converters for reasons described subsequently. Each of the photodetectors is also specific to one test strip, that is photodetector 106 is specific to the test strip beneath slot 2, photodetector 107 is specific to the test strip beneath slot 3, photodetector 108 is specific to the test strip beneath slot 4 and photodetector 109 is specific to the test strip beneath slot 5. The configuration of the photodetectors is such that photodetectors 106 and 108 are staggered with respect to photodetectors 107 and 109 by an offset that is the same as the offset between slots 2 and 3 and slots 4 and 5. The staggering of the LEDs 102-105 and the photodetectors 106-109 compresses space in the lateral direction, and leads to a more compact cassette and reader, thereby improving portability, reducing cost, and saving bench space in operation.

Figure 5:
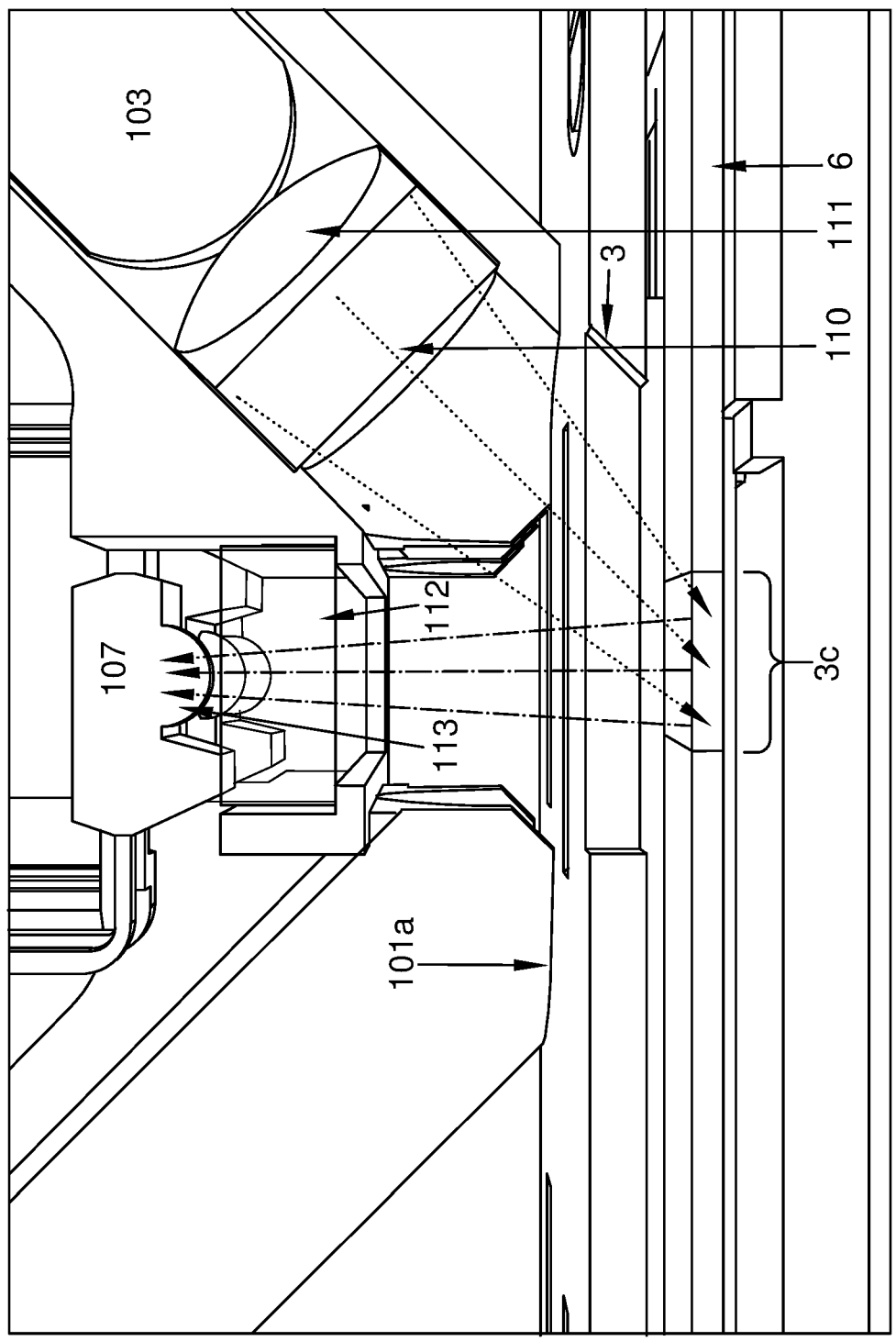
FIG. 5 is an enlarged view of section EE from FIG. 4.

FIG. 5 shows an enlarged view of cross section E-E from FIG. 4. In this view it can be seen that PIV diagnostic detector 100 further comprises within housing 101 a lens 111 beneath LED 103 with an excitation filter 110 sandwiched between. Preferably, the planar side of the lens 111, the surfaces of the excitation filter 110, and the domed surface of LED 103 are all either in contact or in close proximity (i.e. within 1 mm). Lens 111 is preferably used because LEDs typically spread light over a broad radially-expanding conical pattern. Such a light pattern is not desired in this case, as the light intensity would decrease with the square of distance from the lens. To overcome this problem, lens 111 assists in shaping the LED output into a radially-contracting conical pattern as shown by the dashed line in FIG. 5. By shaping the LED light output in this manner, the intensity of the fluorescent excitation light striking zone 3c of the test strip is increased in intensity. This accordingly increases the fluorescent emission intensity at zone 3c of the strip, thereby increasing signal level and sensitivity.

Figure 6:
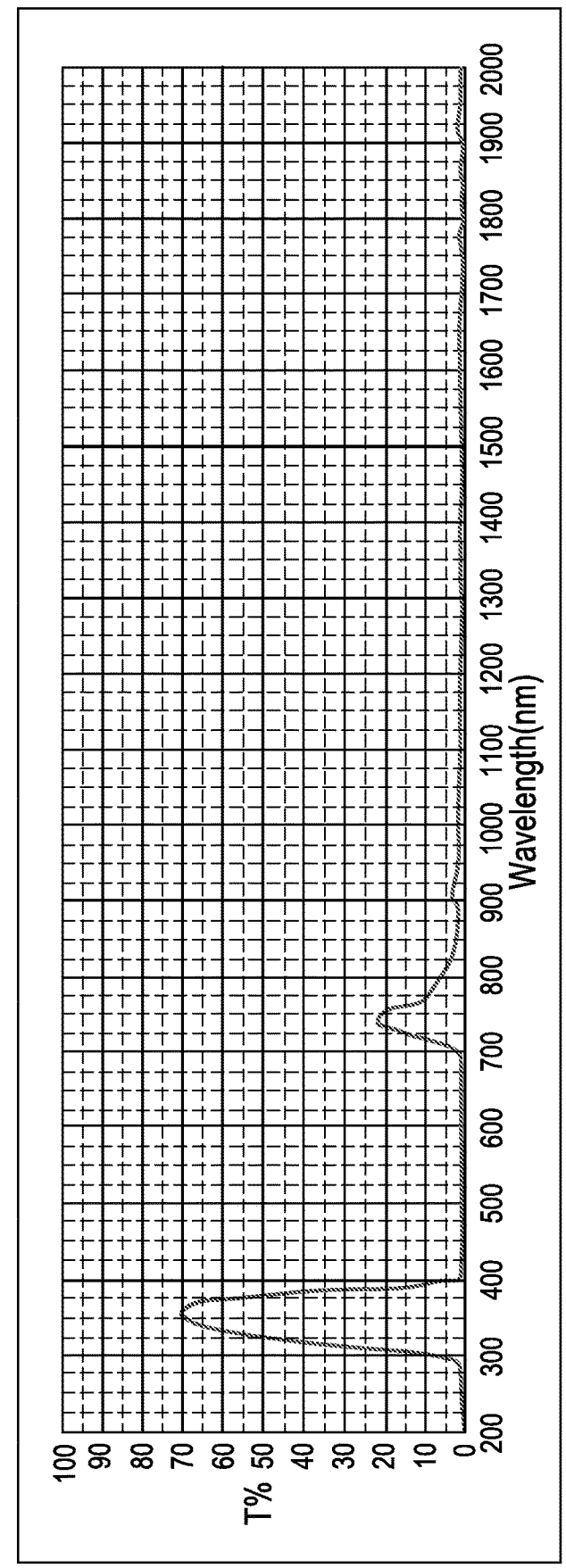
FIG. 6 is a plot of the filter characteristics of a dyed glass UV excitation filter.

Given that the invention described herein utilises a PIV diagnostic detector 100 in an exemplary quadplex format shown in FIG. 4, the use of four TFIFs would be required for excitation filtering of the four LEDs 102-105. The cost of the four TFIFs in such a case would be prohibitively high. However it is necessary to utilise an excitation filter since (as shown in FIG. 3), the LED has a long "tail" emission above the 400 nm range, as illustrated by the intensity measurement of 5,000 counts at 400 nm. The inventors performed spectral measurements of UV LEDs up to 700 nm, and found that the plateau persists in the 615 nm range, which is where it is desired to detect the Europium fluorescent emission. Hence this "tail" emission from the LED still needs to be optically filtered out, otherwise it could undesirable trigger a false positive reading when in fact no analyte is present in the sample. Surprisingly, the inventors found that for fluorescent labels having larger Stokes shift, TFIFs are unnecessary. The inventors found that coloured glass filters (for example pigment dyed glasses) which are commonly used for applications such as photography and astronomy perform sufficiently well as excitation filters for large Stokes shift fluorophores such as Europium, provided they are used in a non-confocal arrangement as shown or similar to that shown in FIG. 5. For example, FIG. 6 shows the typical filter performance of a preferred UV excitation filter, described as the ZWB2 filter manufactured by Optima filter, Japan. This filter cuts off approximately 99% of light from 400-700 nm, and although it does not have the sharp cut-offs of a TFIF, each of these filters costs approximately 1% of a TFIF, thereby enabling such a colored glass UV excitation filter to be utilised in a disposable or limited use design.

Figure 7:
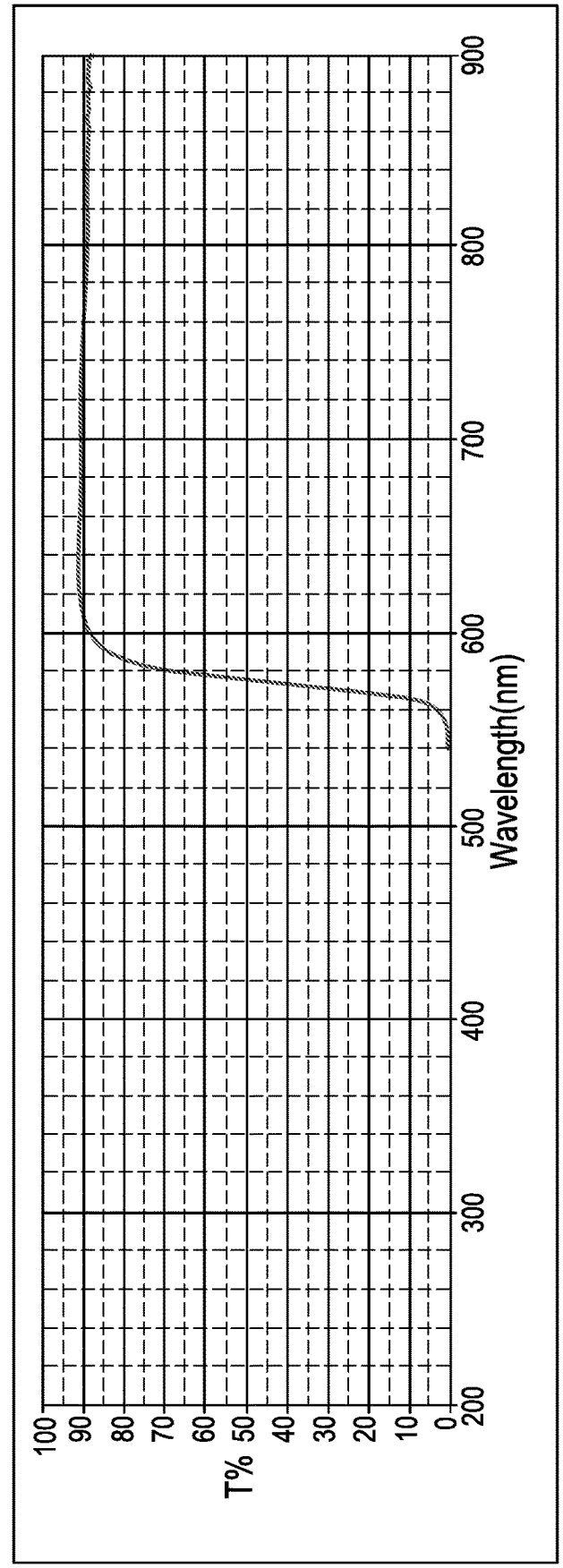
FIG. 7 is a plot of the filter characteristics of a dyed glass orange emission filter.

In FIG. 5, excitation light rays (dashed line) strike the bound fluorescent immuno-complex in zone 3c on the control zone of the test strip 6 in the cartridge 1. This then causes fluorescent emission to take place, and emission light rays (chain dotted line) pass back through an emission filter 112, and through the spherical lens 113 of the preferred light-to-frequency converter 107. Emission filter 112 is also preferably a coloured glass filter, not a TFIF for cost reasons. For example, FIG. 7 shows the typical filter performance of an orange glass filter, described as the CB580 manufactured by Optima filter, Japan. Using this filter, light below 490 nm is blocked by 99.98%, and light below 530 nm is blocked by 99.8%. However, at the emission wavelength peak of the preferred Europium label (615 nm), the filter passes 90.5% of the emission. This is sufficient performance for an emission filter in this case, and again this filter costs approximately 1% of a TFIF, thereby enabling such a coloured glass orange emission filter to be used in a disposable or limited use design.

In FIG. 5, it will also be noted that the invention described herein does not teach the use of a confocal fluorescent detection arrangement. This is because the invention desirably avoids the use of an expensive dichroic mirror TFIF which is required in a confocal arrangement. The embodiment of the invention described teaches the use of an LED 103, lens 111, excitation filter 110, emission filter 112, and photodetector, where the longitudinal axis of the light source extends at an oblique angle with respect to the longitudinal axis of the photodetector (that is not 90°, substantially not 90°, nor multiples of 90°), and are not confocal.

It will also be noted in FIG. 5 that with the arrangement shown, the photodetector 107 may be positioned at a very close distance to the point of fluorescent emission 3c, with distances in the range 3-6 mm being permissible, without obscuring the incident fluorescent excitation light rays (dashed line). Furthermore, the PIV diagnostic detector 100 is preferably positioned just above the upper surface of cassette 1. The inventors determined experimentally that this geometric arrangement has a significant impact on the detector performance. For example, a PIV diagnostic detector positioned at a close distance of approximately 5 mm from 3c produced light intensity signal of 5× that of a PIV diagnostic detector positioned at a distance approximately 10 mm from 3c.

Figure 9:
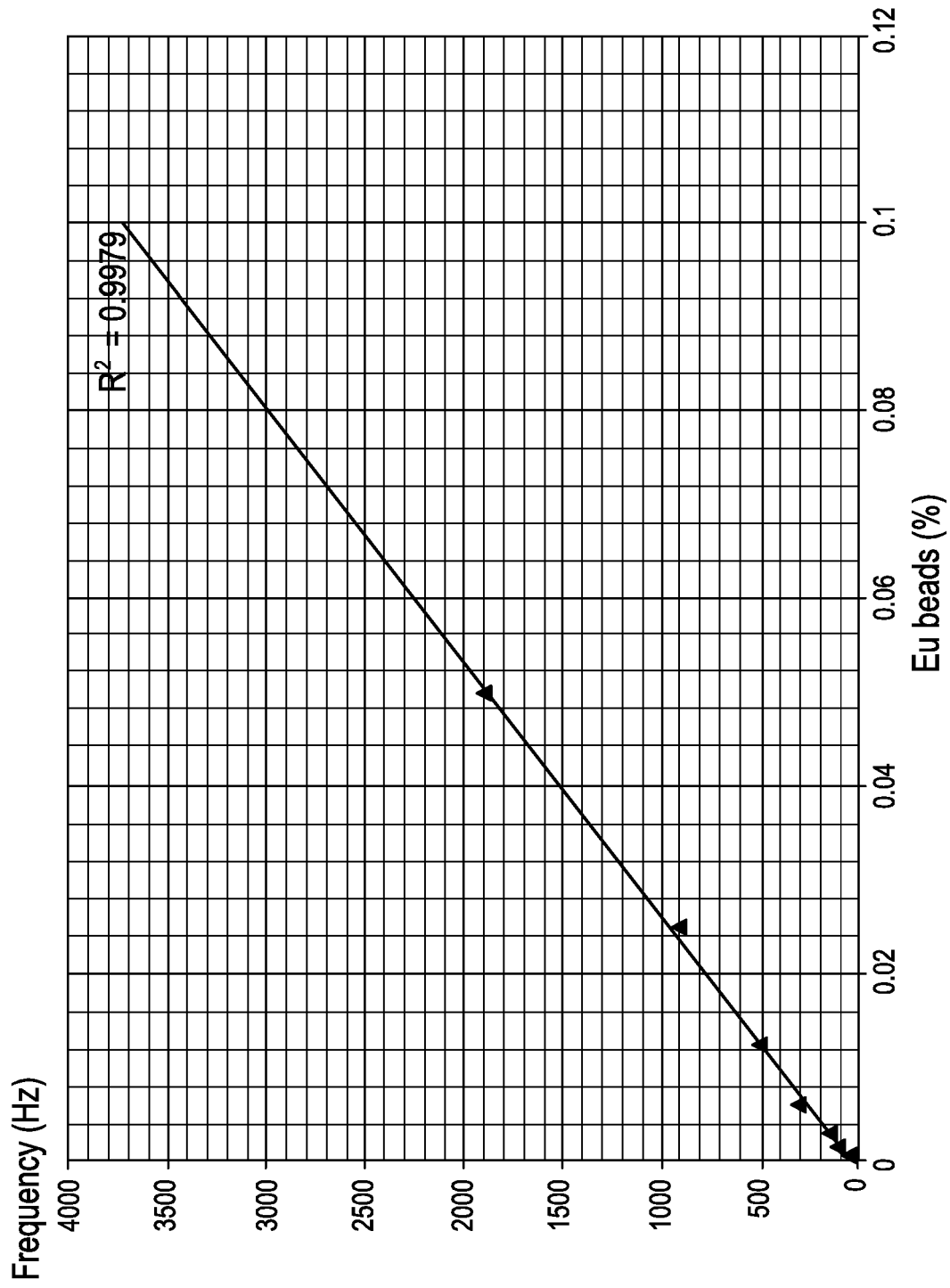
FIG. 9 is a plot of the output of a preferred photodetector (known as a light-to-frequency converter) to variations in Europium bead concentration.

The inventors prototyped a single channel detector with a single 365 nm 5 mm round LED, lens, ZWB2 excitation filter, CB580 emission filter, and a TAOS TSL235 light-to-frequency converter. The light-to-frequency converter frequency output was measured with a VIRTINS digital oscilloscope with an integral data logger. Test strips were made up with a line on the test strip having various dilutions of Europium beads at 0.1%, 0.05%, 0.025%, 0.0125%, 0.00625%, 0.00313%, and 0.00157%. The test strip at 0.00157% bead concentration has weak fluorescence and would correlate to a test strip having a low level of target analyte. Nevertheless, and surprisingly, a 100 Hz signal (above background noise) was measurable by the light-to-frequency converter at 0.00157% bead concentration with a single-plex detector in the arrangement shown in FIG. 5. The relationship between the light-to-frequency converter frequency (which is proportional to fluorescent emission intensity) and bead concentration was also tending linear as shown in FIG. 9.

FIG. 4 shows a further feature of an embodiment of the invention when the PIV diagnostic detector 100 is removably mounted to the cartridge 1. Cartridge slots such as those indicated by numerals 2-5 shape the excitation light striking the test zones to a slit-shape, thereby ensuring that a controllable excitation area of light strikes the fluorescently-emitting zone on the test strip, and eliminating unwanted reflections or auto-fluorescence emissions from the cartridge 1. Furthermore, the cartridge 1 may be preferably manufactured from matte-black plastic, or covered with matte-black anti-reflective coating, again with a view to eliminating unwanted reflections or auto-fluorescence emissions from the cartridge. Still further, light baffling means may be employed between each test strip in parallel to ensure each test strip may be detected independently from an adjacent test strip. Each of the above features, in their own right or in combination, assist in ensuring that unwanted fluorescent background effects are kept to a low level, and that each photodetector receives a signal which is specific to the test zone it is intended to measure. Furthermore, the ability to precisely control the area of fluorescent excitation via the cartridge slots improves assay repeatability and desirably reduces the assay coefficient of variation (CV).

It will be further understood that although the embodiments of the invention shown in FIGS. 4 and 5 and described in the associated text is described in relation to an embodiment for a multiplexed lateral flow test, the PIV diagnostic detector 100 is also suitable for testing the results of PCR amplification in a microfluidic cartridge. In such a case (for example in FIG. 5), the target zone 3c would be the well in a microfluidic cartridge containing the amplified nucleic acids from a PCR reaction, and the PIV diagnostic detector 100 would be detecting the fluorescent-labelled amplicons resulting therefrom. Still further, the PIV diagnostic detector 100 may suit other cartridge or well-plate based assays which utilise fluorescence, for example ELISA, western blot, and other assay techniques.

Light Detectors

When detecting samples at low analyte concentrations, the resolution of the detected fluorescent emitted light from a target becomes increasing important. Prior art fluorescent detection instruments typically use sophisticated and expensive photodetectors to achieve high sensitivity detection of fluorescent emissions. Examples of such detectors include photomultiplier tubes, spectrometers, avalanche photodiodes, cooled CCD megapixel cameras and several other devices. Each of these photodetectors produce an analog signal and therefore an analog to digital converter (ADC) is required to convert the signal to a digital signal, and to ensure sufficient resolution from a sample having a low or faint analyte concentration, an ADC of the order is 16 bits or higher is often required. Such ADCs require more complex and thus expensive processing chips and more memory. Whilst each of these detectors/ADC combinations has a high performance, they are typically orders of magnitude too expensive especially if disposability or limited use is desired.

The inventors hypothesized that a light-to-frequency converter (LFC), such as the TSL235 or similar manufactured by Austrian Microsystems (AMS) may be a suitable detector to enable fluorescent detection to be achieved. Such a LFC comprises a silicon photodiode and a current-to-frequency convertor on a single CMOS chip. Initially, the inventors chose to evaluate such a light detector since the inventors considered that it had an advantage for a disposable or limited use, short life application in that a LFC produces a digital square wave output which is linearly in proportion to the light intensity input. Consequently, the digital square wave output frequency may be counted directly by a suitable low cost 8 bit microprocessor, without requiring an intermediate analogue-to-digital converter. The inventors hypothesised that the ability to not require an ADC in the reader design was an important attribute in order to reduce cost and enable disposability or short life use, whilst ensuring adequate detection from samples having a low analyte concentration.

Figure 8:
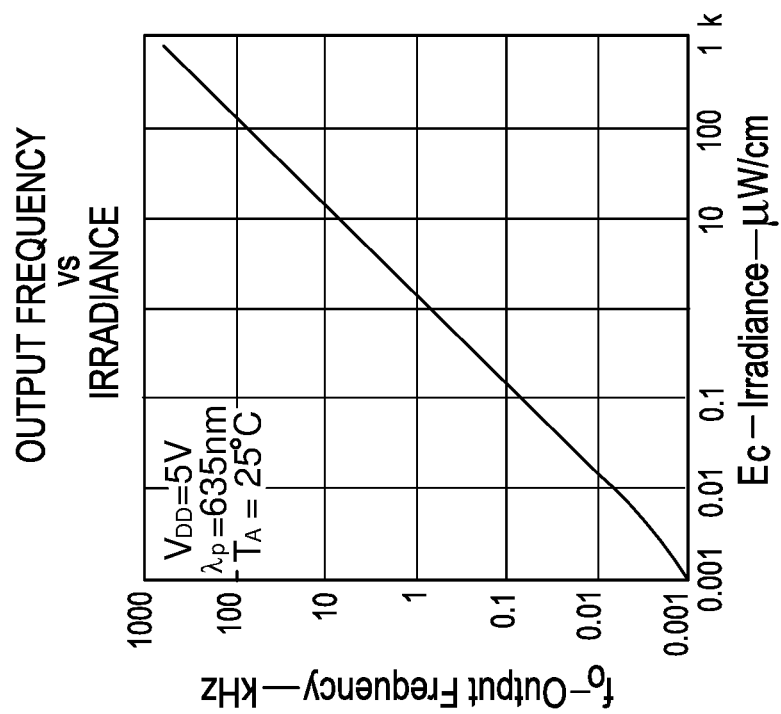
FIG. 8 is a plot of the output of a light-to-frequency converter output versus irradiance (from the manufacturer's datasheet)
Figure 10:
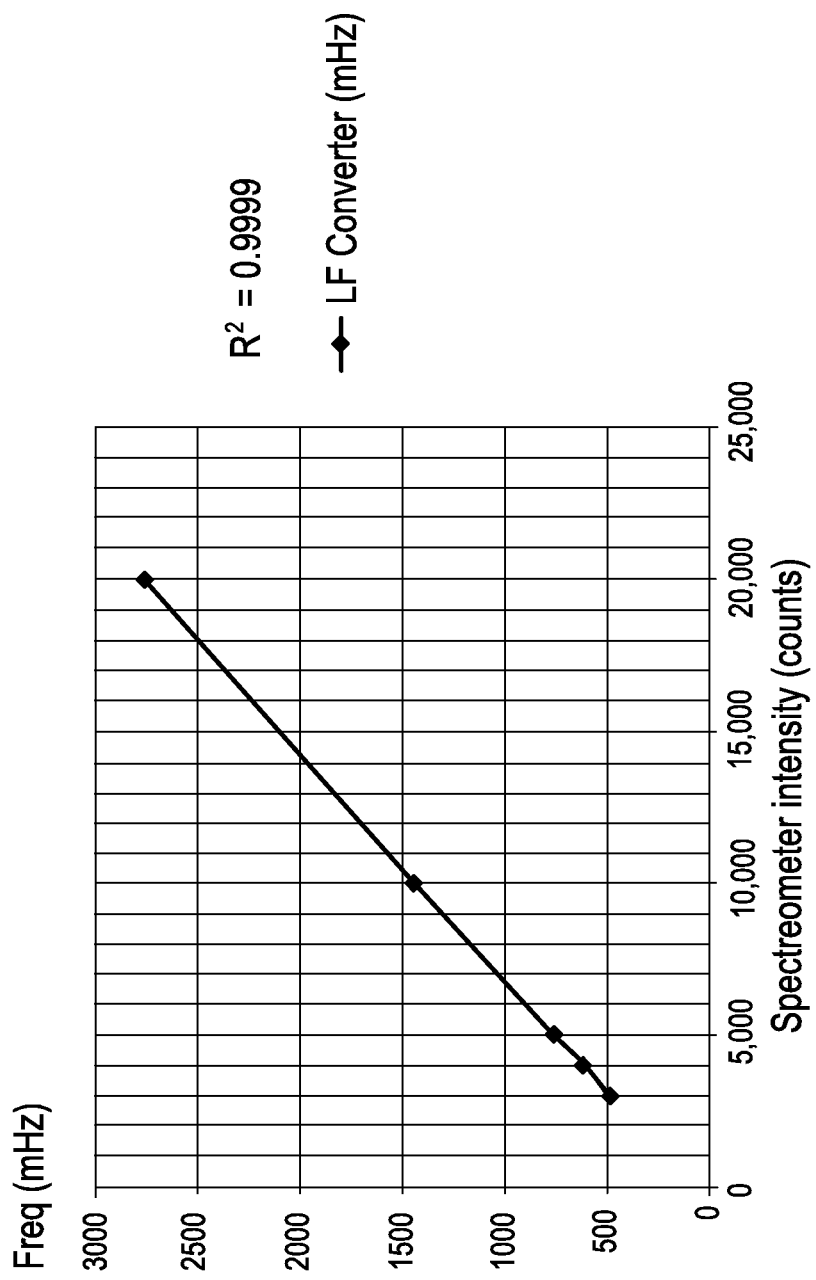
FIG. 10 is a plot of the output of the preferred photodetector benchmarked against a prior art spectrometer, measured at different incident light levels.
Figure 11:
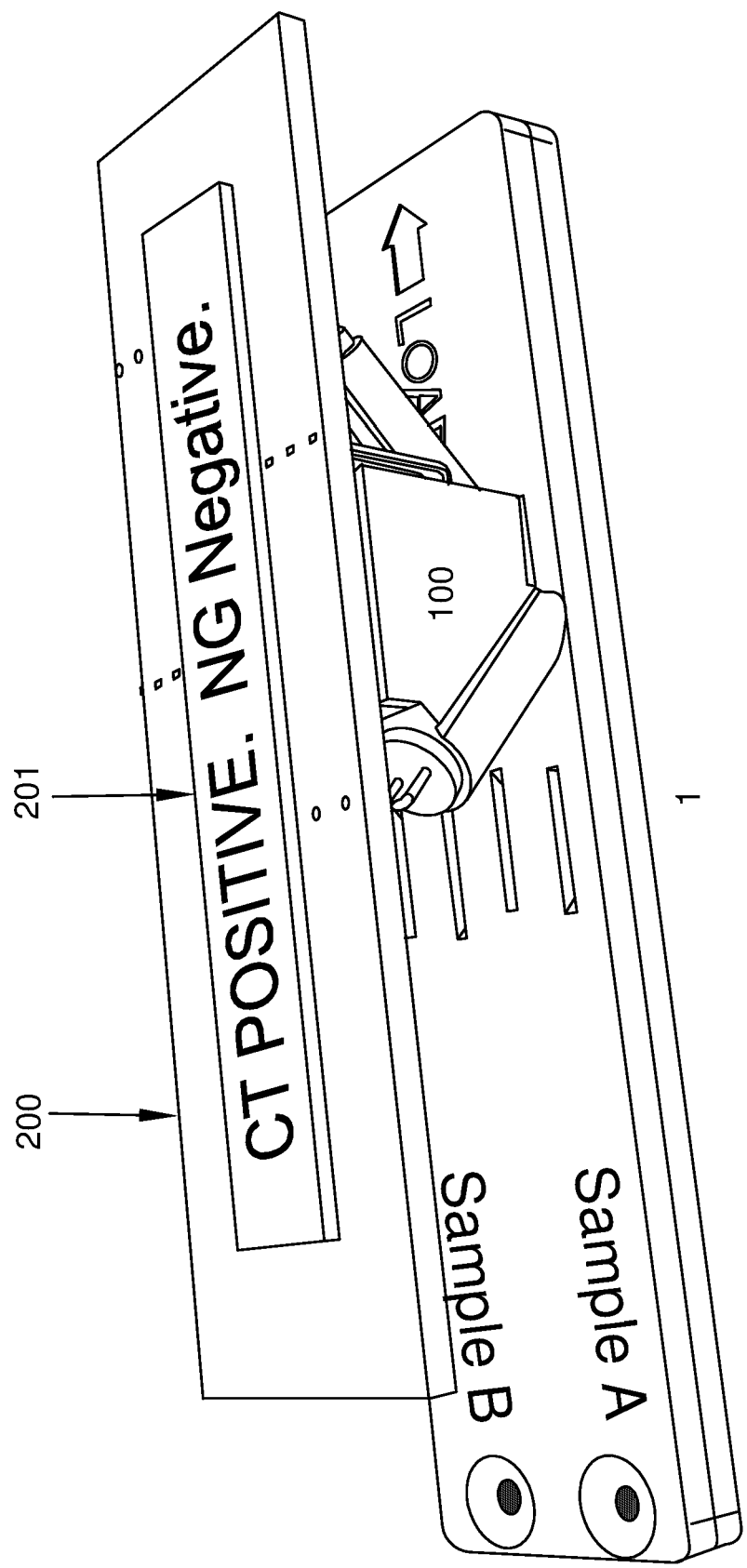
FIG. 11 is a view of the detector and processor/display used in a limited use reader in accordance with the invention described herein.

In researching the AMS TSL235, the product datasheet provides a graph of the detector performance, which is illustrated in FIG. 8. The graph shows that the detector can produce a signal level down to 1 Hz at low light levels of 1 nW/cm$^2$. The inventors performed a benchmarking experiment of the TSL235 against an Ocean Optics spectrometer, which is a widely-used fluorescent detection reference instrument. In this benchmarking experiment, the inventors set up an LED with a variable current control to vary light intensity delivered through a 600 micron fibre optic patch cable to either the spectrometer or the TSL235. FIG. 10 shows the results of that experiment. Surprisingly, the inventors found that the performance of the TSL235 was still quite linear in the range below the manufacturer's published data (FIG. 8). In the sub 1 Hz range (mHz) the inventors found that the detector was capable of achieving linear response to light intensity in the same manner as the spectrometer (the latter costing 3000 times as much). At a spectrometer signal intensity of 3000 counts (equivalent to an analyte concentration of 50 pg/ml), the light to frequency converter delivered a signal of 500 mHz, indicating that the latter was capable of high-sensitivity fluorescent detection.

Furthermore, it will be noted from FIG. 8 that the exemplary TSL235 has 6-7 logs of dynamic range before the detector is saturated, versus 2 logs of usable dynamic range for the Ocean Optics spectrometer. This means that the TSL235 would be able to function as a quantifiable fluorescence detector from very low levels of analyte concentration up to very high levels of analyte concentration. This feature of extensive dynamic range from the light-to-frequency converter is important for several assay types in which it is desired to measure low levels of analyte (for example, testosterone in females which may be below 0.1 ng/ml) as well as high levels of analyte (for example, total testosterone in males with hypogonadism where levels may reach 700 ng/ml) using the same reader. Thus, in this case for testosterone−4 logs of dynamic range is needed.

In the case of molecular diagnostic assays which are required to be quantitative, this feature of high dynamic range is particularly important. This is because a sample which may only contain a small amount of target analyte may produce a weak positive signal after target amplification, however, a sample containing a significant amount of target analyte may produce an extremely strong signal with very high fluorescent emission after target amplification. Thus, a sensitive detector with high dynamic range is particularly useful for such molecular diagnostic assays.

It should be appreciated that embodiments of the invention which include four optical modules need not be configured in the staggered arrangement shown in FIG. 4, different staggering arrangements with differing offsets are envisaged, with the precise configuration depending on the application, the number of optical modules and any size constraints of the respective componentry of the modules.

Furthermore, whilst the embodiments described referring to FIGS. 4 and 5 relate to a PIV diagnostic detector having a plurality of optical modules, and where the optical modules are configured in a staggered arrangement to analyse multiple discrete locations on a test strip (appreciating that the test strip and the modules are located in a fixed position with respect to each other when the test strip is being analysed). It should be appreciated that other embodiments of the invention may relate to a PIV diagnostic detector having a single optical module. In such an embodiment, the PIV diagnostic detector is envisioned to be used in combination with a motion system which is used to drive the test strip underneath the single optical module in a controlled manner. Such motion would allow the PIV diagnostic detector to sense fluorescent emitted light at multiple locations along the test strip. In a still further embodiment, the single optical module may be connected to a motion system to move the module with respect to the test strip in a controlled manner with the same effect. It should be appreciated that said motion system may include any actively or passively powered motion stage mechanism as is known in the art by skilled persons.

Figure 12:
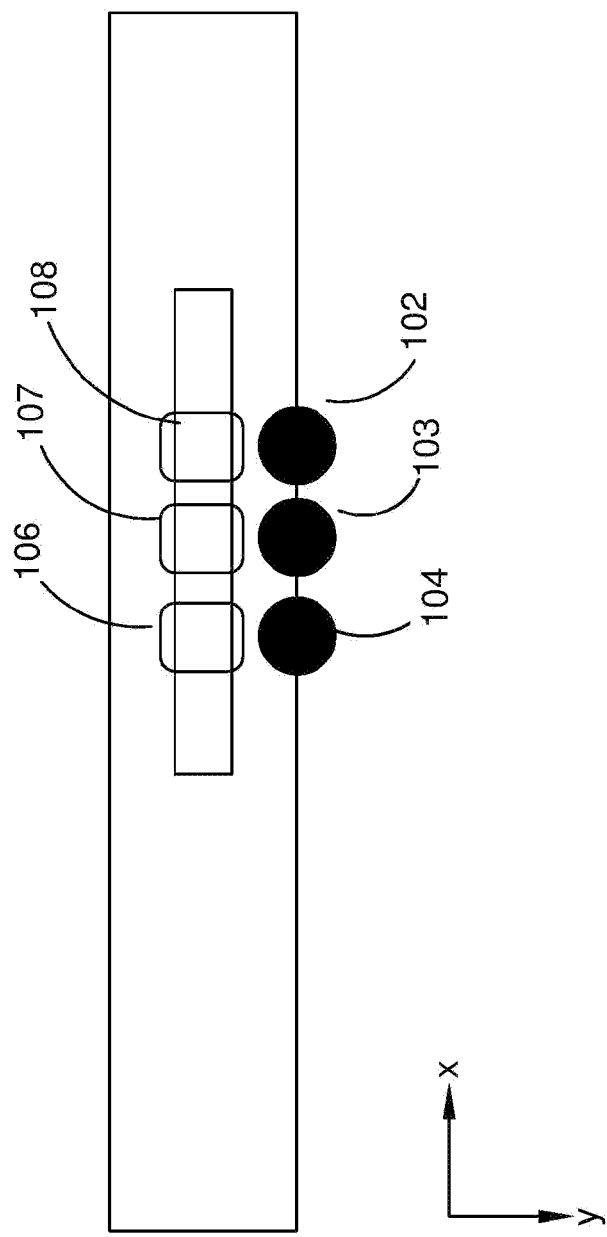
FIG. 12 is a schematic top down view of a diagnostic detector, where the light source and detectors of each optical modules of the PIV diagnostic detector are in a second configuration.

FIG. 12 shows a schematic top down view of a further embodiment of a PIV diagnostic detector having three optical modules, and of which only the LED light sources (102, 103 and 104) and light detectors (106, 107 and 108) of each of the three optical modules are shown. It can be seen from FIG. 12 that in this embodiment of the invention, there is no staggering of the respective optical modules. The optical modules are evenly spaced in the x-direction and remained aligned in the y-direction. Each of the light sources is positioned proximate to the same side of the respective light detector.

Hence, it can be seen that using the invention described herein, it is uniquely possible to achieve a fluorescent detector for in vitro diagnostic assays which has unique attributes to enable disposability or limited, short life use; which enables very high specificity with only one analyte measured per detection channel; which is multi-plexable in a compact footprint; which has very high dynamic range; which could be part of a compact field-portable instrument; which does not require in-field calibration or in-field service; and yet which equals or improves sensitivity over prior art non-disposable/long life fluorescent detectors already in use.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A portable in-vitro (PIV) diagnostic detector operable to perform a fluorescence lateral flow assay on a sample located on a test strip in one or more detection chambers of a cartridge, the PIV diagnostic detector comprising:
   an enclosure defining a slot, the slot shaped to receive the cartridge holding the test strip;
   a first optical module comprising:
      a first LED light source for emitting substantially monochromatic light to illuminate an area of the slot corresponding to a first detection zone associated with at least one detection chamber of the one or more detection chambers of the cartridge when the cartridge is received within the slot;

a first excitation filter interposed between said first light source and said first detection zone;

a first light detector operable to detect fluorescent light emitted from said first detection zone by an excited fluorescent label associated with the sample and to measure an intensity of the fluoresced light while the cartridge is positioned within the slot; and a first emission filter interposed between said first light detector and said first detection zone;

a second optical module comprising:

a second LED light source for emitting substantially monochromatic light to illuminate an area of the slot corresponding to a second detection zone associated with at least one detection chamber of the one or more detection chambers of the cartridge while the cartridge is positioned within the slot;

a second excitation filter interposed between said second light source and said second detection zone;

a second light detector operable to detect fluorescent light emitted from said second detection zone by an excited fluorescent label associated with the sample and to measure an intensity of the fluoresced light while the cartridge is positioned within the slot; and a second emission filter interposed between said second light detector and said second detection zone; and a microprocessor operable to process the measured intensity of the fluoresced light received by each of the first light detector and the second light detector to determine whether an analyte is present in the sample;

wherein the first optical module and the second optical module are arranged in a row either parallel or orthogonal to the longitudinal direction of the cartridge;

wherein the PIV diagnostic detector is adapted to be removably mountable to the cartridge by way of receiving the cartridge in the slot, enabling re-use of the PIV diagnostic detector with subsequent cartridges;

wherein each optical module is configured to cause each respective LED light source to emit light at an acute angle with respect to the fluorescent light emitted from each respective detection zone by the excited fluorescent label and detected by each respective light detector; and wherein the slot, the test strip held in the cartridge positioned within the slot, and each optical module are located in a fixed position with respect to each other while the test strip is being analyzed.

2. The PIV diagnostic detector according to claim 1, wherein the optical modules are configured to analyze multiple discrete locations on the test strip, by way of the first optical module analyzing a first discrete location associated with the first detection zone and the second optical module analyzing a second discrete location associated with the second detection zone.

3. The PIV diagnostic detector according to claim 1, wherein a center of the first optical module is aligned relative to a center of the second optical module.

4. The PIV diagnostic detector according to claim 1, wherein the LED light source of each optical module is an ultraviolet light emitting diode.

5. The PIV diagnostic detector according to claim 1, wherein the excitation filter and the emission filter of each optical module comprise a dyed-glass absorbance filter.

6. The PIV diagnostic detector according to claim 1, further comprising in respect of each optical module, a first converging lens positioned between each respective light source and each respective excitation filter, said first converging lens configured to focus light on each respective detection zone.

7. The PIV diagnostic detector according to claim 6, further comprising in respect of each optical module, a second converging lens positioned between each respective light detector and each respective emission filter, said second converging lens configured to focus light on each respective light detector.

8. The PIV diagnostic detector according to claim 1, wherein each respective light detector of each optical module is positionable proximate each respective detection zone at a distance of between 3 mm and 6 mm from each respective detection zone.

9. The PIV diagnostic detector according to claim 8, wherein the light detector of each optical module is positionable proximate the respective detection zone at a distance of about 5 mm from the detection zone.

10. The PIV diagnostic detector of claim 1, wherein each light detector comprises a light to frequency converter.

11. An apparatus operable to perform a fluorescence assay on a sample in one or more detection chambers of a cartridge, the apparatus comprising:

a portable in-vitro (PIV) diagnostic detector including
(i) an enclosure defining a slot, the slot shaped to receive the cartridge;
(ii) a first optical module comprising:
a first LED light source for emitting substantially monochromatic light to illuminate a first detection zone associated with at least one detection chamber of the one or more detection chambers;

a first excitation filter interposed between said first light source and said first detection zone;

a first light detector comprising a light to frequency converter, the first light detector operable to detect fluorescent light emitted from said first detection zone by an excited fluorescent label associated with the sample and to measure an intensity of the fluoresced light; and a first emission filter interposed between said first light detector and said first detection zone; and a second optical module comprising:
a second LED light source for emitting substantially monochromatic light to illuminate a second detection zone associated with at least one detection chamber of the one or more detection chambers;

a second excitation filter interposed between said second light source and said second detection zone;

a second light detector comprising a light to frequency converter, the second light detector operable to detect fluorescent light emitted from said second detection zone by an excited fluorescent label associated with the sample and to measure an intensity of the fluoresced light; and a second emission filter interposed between said second light detector and said second detection zone; and (iii) a microprocessor operable to process the measured intensity of the fluoresced light received by each of the first light detector and the second light detector to determine whether an analyte is present in the sample;

wherein the first optical module and the second optical module are arranged in a row either parallel or orthogonal to the longitudinal direction of the cartridge; wherein each optical module is configured to cause each respective light source to emit light at an acute angle with respect to the fluorescent light emitted from each respective detection zone by the excited fluorescent label and detected by each respective light detector; and wherein the slot, the cartridge and each optical module are located in a fixed position with respect to each other while the cartridge is being analyzed; and the cartridge, wherein the PIV diagnostic detector is removably mountable to the cartridge by way of receiving the cartridge in the slot, enabling re-use of the PIV diagnostic detector with subsequent cartridges.

12. The apparatus according to claim 11, wherein the cartridge comprises a plurality of slits with each slit configured to overlie one of said at least one detection chambers.

13. The apparatus according to claim 11, wherein the cartridge is manufactured from a matte-black plastic, or the cartridge is substantially covered with an anti-reflective coating.

14. The apparatus according to claim 11, wherein the cartridge further comprises a plurality of test strips and a light baffle means positioned between each adjacent test strip.

* * * * *